(12) United States Patent
Abe et al.

(10) Patent No.: US 9,331,788 B2
(45) Date of Patent: May 3, 2016

(54) COMMUNICATION DEVICE AND COMMUNICATION METHOD

(71) Applicants: Hiroyuki Abe, Miyagi (JP); Junichi Ikeda, Miyagi (JP); Satoru Numakura, Miyagi (JP); Mitsuru Suzuki, Miyagi (JP)

(72) Inventors: Hiroyuki Abe, Miyagi (JP); Junichi Ikeda, Miyagi (JP); Satoru Numakura, Miyagi (JP); Mitsuru Suzuki, Miyagi (JP)

(73) Assignee: RICOH COMPANY, LIMITED, Tokyo (JP)

( * ) Notice: Subject to any disclaimer, the term of this patent is extended or adjusted under 35 U.S.C. 154(b) by 381 days.

(21) Appl. No.: 13/747,612

(22) Filed: Jan. 23, 2013

(65) Prior Publication Data
US 2013/0188956 A1  Jul. 25, 2013

(30) Foreign Application Priority Data
Jan. 24, 2012  (JP) ................................. 2012-011958

(51) Int. Cl.
| | | |
|---|---|---|
| *H04J 14/02* | (2006.01) | |
| *H04B 10/04* | (2006.01) | |
| *H04B 10/12* | (2006.01) | |
| *H04B 10/00* | (2013.01) | |
| *H04B 10/50* | (2013.01) | |
| *H04B 10/2507* | (2013.01) | |

(52) U.S. Cl.
CPC ............ *H04B 10/50* (2013.01); *H04B 10/2507* (2013.01); *H04B 10/504* (2013.01)

(58) Field of Classification Search
None
See application file for complete search history.

(56) References Cited

U.S. PATENT DOCUMENTS

| | | |
|---|---|---|
| 7,583,749 B2 | 9/2009 | Kasai et al. |
| 8,582,976 B2 * | 11/2013 | Boyd ............................ 398/158 |
| 2007/0098412 A1 * | 5/2007 | Scoggins et al. .............. 398/182 |
| 2010/0098436 A1 * | 4/2010 | Mahgerefteh ........ H04B 10/504 398/192 |
| 2011/0225341 A1 | 9/2011 | Satoh et al. |
| 2012/0106969 A1 * | 5/2012 | Ogiwara et al. ................ 398/79 |

FOREIGN PATENT DOCUMENTS

| | | |
|---|---|---|
| JP | 2007-243802 | 9/2007 |
| JP | 2009514340 A | 4/2009 |
| JP | 2010-245616 | 10/2010 |
| JP | 2011-130231 | 6/2011 |
| JP | 2011-186968 | 9/2011 |
| WO | WO-2005027368 A1 | 3/2005 |
| WO | WO-2008053858 A2 | 5/2008 |

OTHER PUBLICATIONS

Office Action for Corresponding Japanese Patent Application No. 2012-011958 issued on Dec. 22, 2015.

* cited by examiner

*Primary Examiner* — Shi K Li
*Assistant Examiner* — Mina Shalaby
(74) *Attorney, Agent, or Firm* — Harness, Dickey & Pierce, P.L.C.

(57) ABSTRACT

A communication device includes a signal correcting unit that performs signal correction on an electric signal indicating information to be transmitted to reduce signal deterioration occurring in transmission of the electric signal; a conversion unit that converts the electric signal subjected to the signal correction into a digital signal on which information indicating the signal correction performed by the signal correcting unit is superimposed; and a light-emitting element that emits light in accordance with the digital signal converted by the conversion unit.

7 Claims, 7 Drawing Sheets

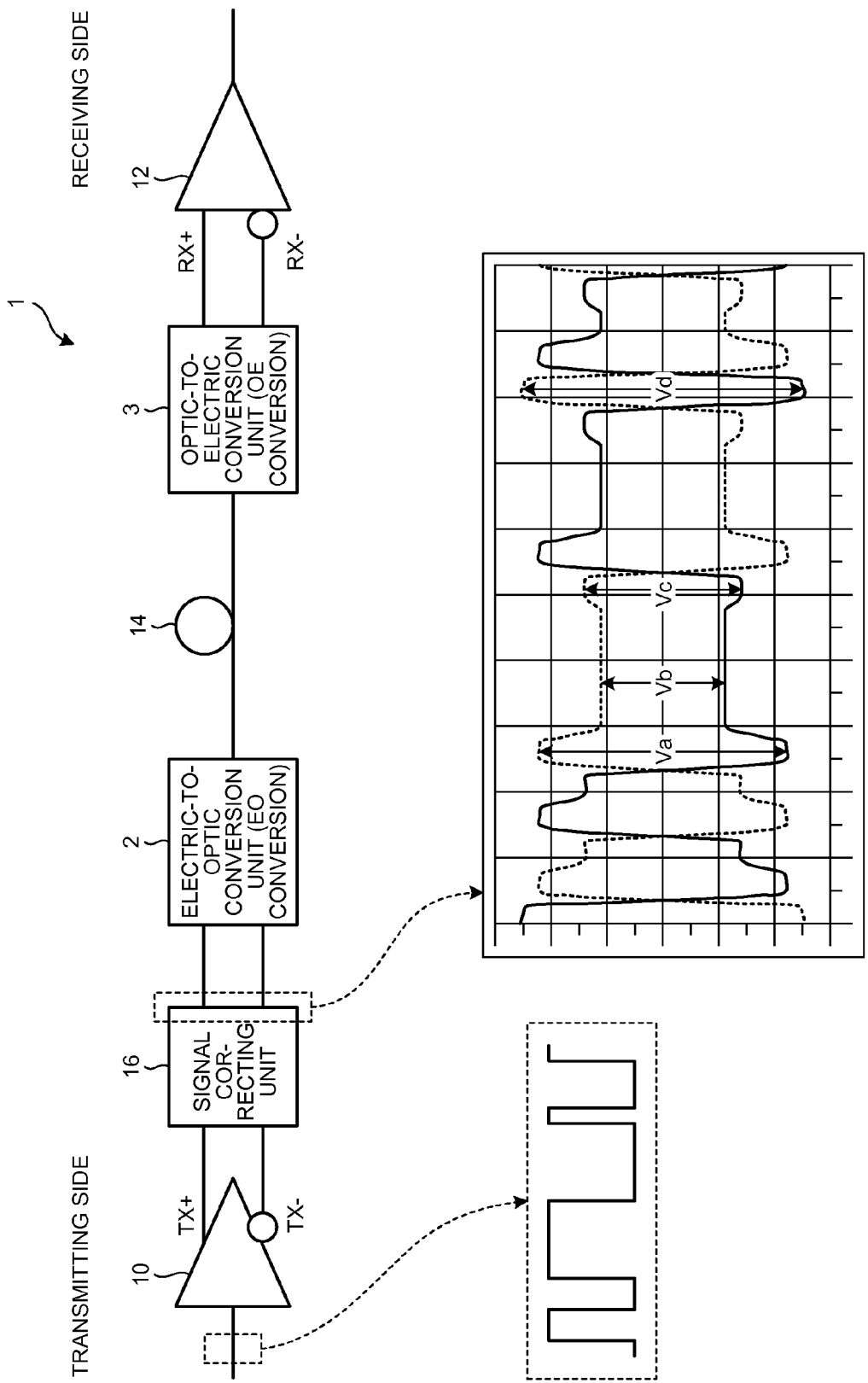

FIG.2

| NORMAL SIGNAL, SIGNAL TO WHICH PRE-EMPHASIS IS APPLIED | NORMAL SIGNAL, SIGNAL TO WHICH DE-EMPHASIS IS APPLIED | NORMAL SIGNAL, SIGNAL TO WHICH DE-EMPHASIS AND PRESHOOT ARE APPLIED |
|---|---|---|
| 0 1 0 1 1 1 0 1 1 0 0 0 1 1 1 1 | 0 1 0 1 1 1 0 1 1 0 0 0 1 1 1 1 | 0 1 0 1 1 1 0 1 1 0 0 0 1 1 1 1 |
| PRE-EMPHASIS: AMPLITUDE OF TRANSITION BIT INCREASES | DE-EMPHASIS: AMPLITUDE OF NON-TRANSITION BIT DECREASES | PRESHOOT: AMPLITUDE OF BIT IMMEDIATELY BEFORE TRANSITION BIT IS ALSO CONTROLLED |

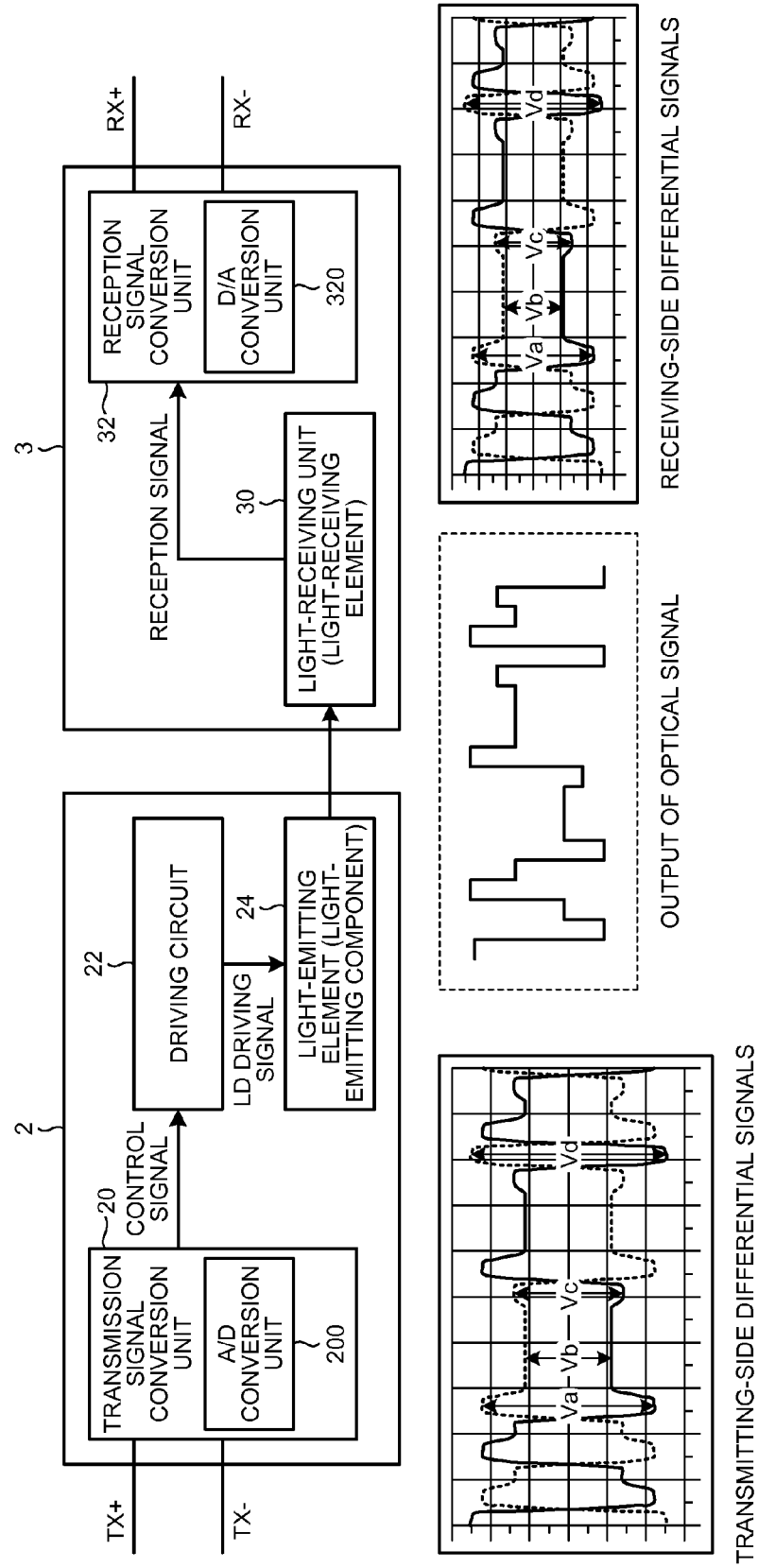

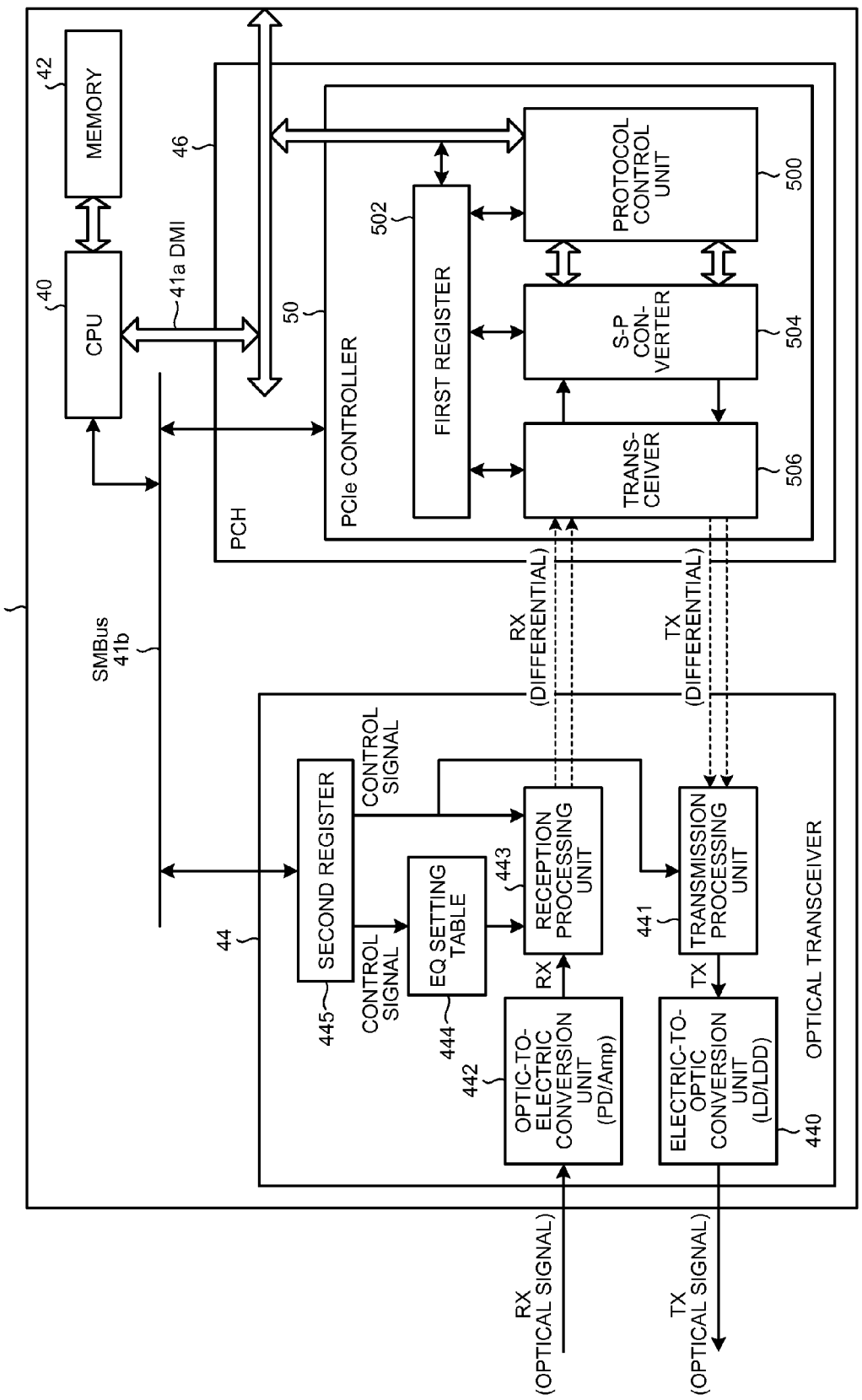

| Encoding | De-emphasis (dB) | Preshoot (dB) |
|---|---|---|
| 0000b | -6 | 0 |
| 0001b | -3.5 | 0 |
| 0010b | -4.5 | 0 |
| 0011b | -2.5 | 0 |
| 0100b | 0 | 0 |
| 0101b | 0 | 2 |
| 0110b | 0 | 2.5 |
| 0111b | -6 | 3.5 |
| 1000b | -3.5 | 3.5 |
| 1001b | 0 | 3.5 |
| 1010b | See description above. | See description above. |
| 1011b to 1111b | Reserved | |

COMPLIANCE PRESET

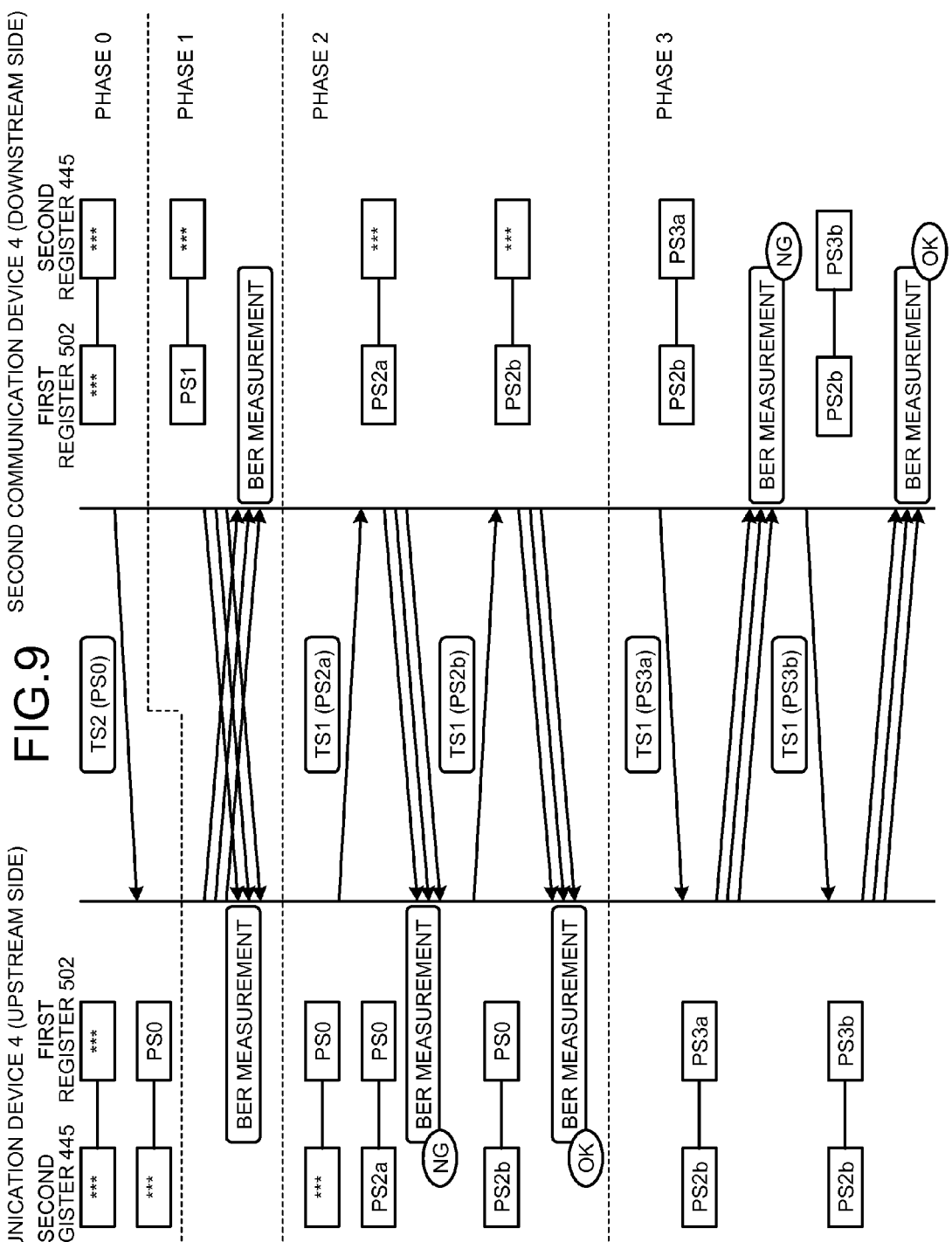

COMMUNICATION DEVICE AND COMMUNICATION METHOD

CROSS-REFERENCE TO RELATED APPLICATIONS

The present application claims priority to and incorporates by reference the entire contents of Japanese Patent Application No. 2012-011958 filed in Japan on Jan. 24, 2012.

BACKGROUND OF THE INVENTION

1. Field of the Invention

The present invention relates to a communication device and a communication method.

2. Description of the Related Art

In the past, signal deterioration was known to occur due to inter symbol interference (ISI) or the like of a digital signal in high-speed serial communication. The ISI is a phenomenon in which a difference occurs in a signal amplitude of a receiving side between a signal pattern in which logical inversion frequently occurs and a signal pattern in which the same logic continues.

As a countermeasure against the ISI, a method of relatively emphasizing a signal level when logical conversion occurs is generally used. Further, in order to restore a signal waveform changed due to the characteristics of a transmission path or minimize a change in the signal waveform, an equalizer is provided to adjust a reception signal.

For example, Japanese Patent Application Laid-open No. 2010-245616 discloses an equalizer parameter setting device that determines an equalizer parameter based on the detected characteristics of a receiver.

Further, Japanese Patent Application Laid-open No. 2011-130231 discloses a parameter setting device that determines a signal intensity parameter, a signal amplitude parameter, and an equalizer parameter based on a predetermined determination criterion and the detected characteristics of a receiver.

Furthermore, Japanese Patent Application Laid-open No. 2007-243802 discloses an equalizer control device that sets a filter parameter value in an equalizer performing waveform correction on an electric signal converted from an optical signal.

However, when an optical signal is used in a part of a communication path, a change in the amplitude of an electric signal is deleted in ON and OFF of a light-emitting component indicating digital signals in spite of the fact that the amplitude of the electric signal is changed and equalizing is performed. Therefore, there is a problem that an equalizing signal superimposed on a transmitting side disappears and is not received on a receiving side, and thus signal deterioration may not be reduced.

It is desirable to provide a communication device and a communication method capable of reducing signal deterioration, even when an optical signal is used in a part of a communication path.

SUMMARY OF THE INVENTION

It is an object of the present invention to at least partially solve the problems in the conventional technology.

According to an aspect of the present invention, there is provided a communication device includes: a signal correcting unit that performs signal correction on an electric signal indicating information to be transmitted to reduce signal deterioration occurring in transmission of the electric signal; a conversion unit that converts the electric signal subjected to the signal correction into a digital signal on which information indicating the signal correction performed by the signal correcting unit is superimposed; and a light-emitting element that emits light in accordance with the digital signal converted by the conversion unit.

According to another aspect of the present invention, there is provided a communication device includes: an optic-to-electric conversion unit that receives an optical signal including first specified information used to specify a signal correction pattern and performs optic-to-electric conversion to convert the received optical signal into a digital electric signal; a first storage unit that stores the first specified information; a signal correcting unit that reduces signal deterioration occurring in transmission of the electric signal by performing signal correction on the electric signal by the pattern of the signal correction specified by the first specified information; a light-emitting element that emits light in accordance with the electric signal subjected to the signal correction by the signal correcting unit; a second storage unit that stores second specified information used to specify a signal correction pattern; a restoring unit that restores the digital electric signal subjected to the optic-to-electric conversion by the optic-to-electric conversion unit using the signal correction pattern specified by the second specified information; and a control unit that updates the second specified information and performs control such that the signal correcting unit performs signal correction on the electric signal including the updated second specified information until a bit error ratio of the electric signal restored by the restoring unit reaches a predetermined threshold value.

According to still another aspect of the present invention, there is provided a communication method performed by a communication device, includes: performing signal correction on an electric signal indicating information to be transmitted to reduce signal deterioration occurring in transmission of the electric signal; converting the electric signal subjected to the signal correction into a digital signal on which information indicating the signal correction is superimposed; and emitting light in accordance with the converted digital signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating the configuration of a communication system that performs communication between communication devices according to a first embodiment;

FIG. 2 is a table illustrating an example of equalization (signal correction) performed by a signal correcting unit;

FIG. 3 is a block diagram illustrating the functions of an EO conversion unit and an OE conversion unit;

FIG. 6 is a block diagram illustrating the function of a communication device according to a second embodiment;

FIG. 9 is a diagram illustrating a sequence of a process of selecting an equalizing pattern by two communication devices according to the second embodiment.

DETAILED DESCRIPTION OF THE PREFERRED EMBODIMENTS

Figure 4:
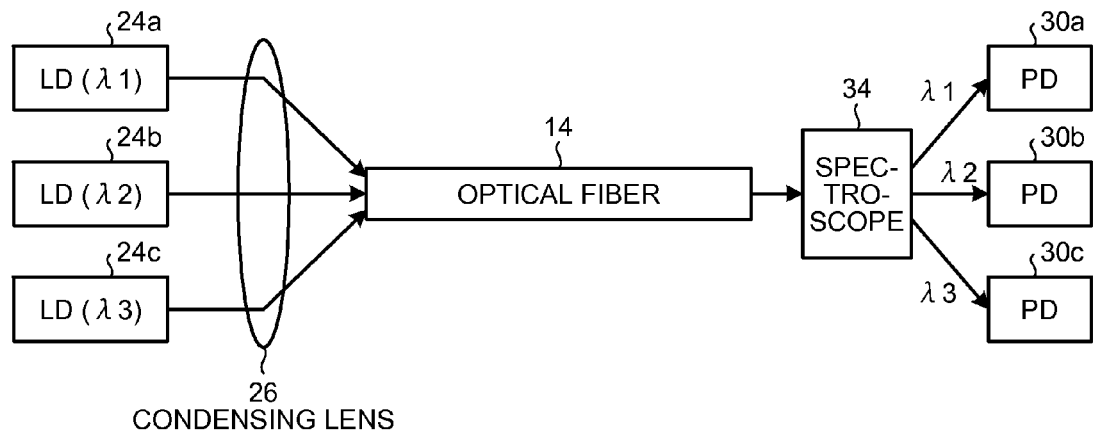
FIG. 4 is a block diagram illustrating a modification example of the EO conversion unit and the OE conversion unit illustrated in FIG. 1.

Hereinafter, embodiments of a communication system that performs communication between communication devices will be described in detail with reference to the appended drawings.

First Embodiment

FIG. 1 is a diagram illustrating the configuration of a communication system 1 that performs communication between communication devices according to a first embodiment. The communication system 1 is a high-speed serial communication system in which a transmitting device 10 and a receiving device 12 are connected to each other via an optical communication path 14 such as an optical fiber.

A transmitting side of the communication system 1 includes a signal correcting unit 16 that performs signal correction on an output of the transmitting device 10 and an electric-to-optic conversion unit (EO conversion unit) 2 that converts an electric signal output by the signal correcting unit 16 into an optical signal. A receiving side of the communication system 1 includes an optic-to-electric conversion unit (OE conversion unit) 3 that converts the optical signal transmitted via the optical communication path 14 into an electric signal.

Further, in the communication system 1, one communication device of the transmitting side may be configured by the transmitting device 10, the signal correcting unit 16, and the EO conversion unit 2, and one communication device of the receiving side may be configured by the OE conversion unit 3 and the receiving device 12. Furthermore, one communication device may have all of the transmission function of the transmitting device 10, the signal correcting unit 16, and the EO conversion unit 2 and the reception function of the OE conversion unit 3 and the receiving device 12. When one communication device has the transmission and reception functions, the communication system 1 can perform bi-directional communication.

The transmitting device 10 receives an input of a digital signal and transmits (outputs) an electric signal at a communication rate of, for example, 5 Gbps or more. The transmitting device 10 outputs, for example, low-voltage differential signals TX+ and TX−. Further, the differential signals TX+ and TX− output by the transmitting device 10 are analog electric signals that have an amplitude indicating a digital value.

The receiving device 12 receives an electric signal at a communication rate of, for example, 5 Gbps or more. Further, the receiving device 12 receives, for example, low-voltage differential signals RX+ and RX−. Further, the differential signals RX+ and RX− received by the receiving device 12 are analog electric signals that have an amplitude indicating a digital value.

As illustrated in FIG. 1, the signal correcting unit 16 reduces signal deterioration occurring in transmission of the electric signal by performing equalization such as emphasis on the electric signal output by the transmitting device 10. The signal correcting unit 16 performs the equalization (signal correction) in accordance with a rule (predetermined information) determined in advance.

As illustrated in FIG. 2, examples of the equalization (EQ) include pre-emphasis, de-emphasis, and preshoot. The pre-emphasis is emphasis performed to increase the amplitude of a signal (transition bit) in which logical inversion happens. The de-emphasis is signal correction performed to decrease the amplitude of a signal (non-transition bit) in which logical inversion does not happen. That is, a level difference between the transition bit and the non-transition bit on the receiving side can be decreased by performing the equalization on a signal in which logical conversion occurs in transmission.

There is a method of controlling an amplitude minutely with reference to a bit pattern of two or more bits. The preshoot is performed to also control a bit amplitude adjacent before the transition bit and is defined in PCI EXPRESS (registered trademark) 3.0.

Next, the EO conversion unit 2 and the OE conversion unit 3 will be described in detail. FIG. 3 is a block diagram illustrating the functions of the EO conversion unit 2 and the OE conversion unit 3. The EO conversion unit 2 includes a transmission signal conversion unit 20, a driving circuit 22, and a light-emitting element 24. The transmission signal conversion unit 20 includes an A/D conversion unit 200 that converts an analog signal into a digital signal.

The transmission signal conversion unit 20 receives the differential signals TX+ and TX− and converts the differential signals TX+ and TX− into digital signals. Further, the transmission signal conversion unit 20 takes a difference between the differential signals TX+ and TX−, converts the differential signals TX+ and TX− into one control signal, and outputs the control signal to the driving circuit 22. That is, the transmission signal conversion unit 20 converts the electric signal subjected to the signal correction by the signal correcting unit 16 into a digital signal on which information indicating the signal correction performed by the signal correcting unit 16 is superimposed.

The driving circuit 22 drives the light-emitting element 24 such that the intensity of light emitted by the light-emitting element 24 is changed in accordance with the value (control signal) of the digital signal received from the transmission signal conversion unit 20. The light-emitting element 24 is a light-emitting element such as a laser diode (LD).

Accordingly, when the transmitting-side differential signals (analog electric signal having an amplitude indicating the digital value) subjected to the equalization by the signal correcting unit 16 (see FIG. 1) are received, the EO conversion unit 2 outputs optical signals at different optical intensities in accordance with the amplitudes of the transmitting-side differential signals.

The OE conversion unit 3 includes a light-receiving unit 30 and a reception signal conversion unit 32. The light-receiving unit 30 is a light-receiving element such as a photodiode (PD). The light-receiving unit 30 converts the received optical signal into an electric signal (reception signal which is a digital signal) and outputs the electric signal to the reception signal conversion unit 32.

The reception signal conversion unit 32 includes a D/A conversion unit 320 that converts a digital signal into an analog signal. When the reception signal conversion unit 32 receives the reception signal from the light-receiving unit 30, the reception signal conversion unit 32 reproduces the differential signals RX+ and RX−. Further, the reception signal conversion unit 32 converts the reproduced differential signals RX+ and RX− into analog signals and outputs the converted analog signals.

That is, when the OE conversion unit 3 receives the output of the optical signal, the OE conversion unit 3 restores receiving-side differential signals corresponding to the transmitting-side differential signals received by the EO conversion unit 2.

The optical signal output from the light-emitting element 24 is proportional to the level of the electric signal output by the signal correcting unit 16. However, the transmission signal conversion unit 20 may perform nonlinear output control in accordance with the characteristics of the driving circuit 22 and the light-emitting element 24 and the characteristic of the light-receiving unit 30. In this case, the reception signal conversion unit 32 performs correction control on the nonlinear output.

Thus, since the communication system 1 that performs the communication between the communication devices according to the first embodiment converts the electric signal indicating information to be transmitted into the digital signal in which information indicating the signal correction performed to reduce signal deterioration is superimposed, the information indicating the signal correction can be transmitted. Thus, even when the optical signal is used in a part of a communication path, the signal deterioration can be reduced.

Next, a modification example of the communication system 1 will be described. In the communication system 1 according to the first embodiment, the information indicating the signal correction performed by the signal correcting unit 16 is transmitted by outputting the optical signals with the different optical intensities in accordance with the amplitudes of the transmitting-side differential signals. The communication system 1 may be configured to multiplex the information indicating the signal correction performed by the signal correcting unit 16 into an optical signal and transmit the multiplexed optical signal. Hereinafter, a modification example will be described in which information indicating signal correction is multiplexed into an optical signal and the multiplexed optical signal is transmitted.

Modification Example

In the modification example, the transmission signal conversion unit 20 (see FIG. 3) encodes an electric signal converted as a digital signal by the A/D conversion unit 200. For example, when the electric signal has eight levels, the EO conversion unit 2 converts a signal encoded with 3 bits into an optical signal. The OE conversion unit 3 restores the encoded signal to the electric signal having eight levels by decoding the encoded signal.

Figure 5A:
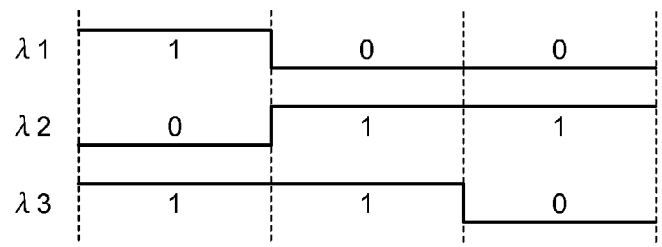
FIGS. 5A and 5B are diagrams illustrating transmission signal examples of optical signals encoded with multiple bits by the EO conversion unit.

FIG. 4 is a block diagram illustrating the modification example of the EO conversion unit 2 and the OE conversion unit 3 illustrated in FIG. 1. In the modification example, the EO conversion unit 2 performs, for example, WDM (wavelength division multiplexing) to transmit an optical signal encoded with many bits via the optical communication path 14. The WDM is a technology for realizing communication of a plurality of bits using one optical communication path 14 by using light with a plurality of different wavelengths. In the modification example of the EO conversion unit 2 and the OE conversion unit 3 illustrated in FIG. 4, optical signals with three wavelengths illustrated in FIG. 5A can simultaneously be transmitted. Further, the EO conversion unit 2 encodes the information indicating the signal correction performed by the signal correcting unit 16 to superimpose the information on, for example, at least one of the wavelengths subjected to the wavelength division multiplexing.

As illustrated in FIG. 4, the EO conversion unit 2 includes three light-emitting elements 24a, 24b, and 24c and a condensing lens 26, instead of the light-emitting element 24 of the first embodiment. The driving circuit 22 drives each of the light-emitting elements 24a, 24b, and 24c under the control of the transmission signal conversion unit 20. The three light-emitting elements 24a, 24b, and 24c output, for example, three optical signals with different wavelengths (wavelengths $\lambda 1$, $\lambda 2$, and $\lambda 3$). The EO conversion unit 2 may multiplex signals by outputting the signals with a plurality of different wavelengths. The invention is not limited to the case in which the signals with three different wavelengths are output.

The OE conversion unit 3 may be configured to include a spectroscope 34 and three light-receiving units 30a, 30b, and 30c, instead of the light-receiving unit 30 of the first embodiment. The spectroscope 34 disperses the three optical signals with the wavelengths $\lambda 1$, $\lambda 2$, and $\lambda 3$ and outputs the three optical signals to the three light-receiving units 30a, 30b, and 30c, respectively. The reception signal conversion unit 32 receives the reception signals output by the light-receiving units 30a, 30b, and 30c and performs a reception encoding process (decoding process). The light-receiving units 30a, 30b, and 30c may have the same configuration.

The transmission signal conversion unit 20 encodes information indicating predetermined signal correction in accordance with any method. The driving circuit 22 drives the light-emitting elements 24a, 24b, and 24c such that the encoded information indicating the signal correction is superimposed on the optical signal with the wavelength output from at least one of the light-emitting elements 24a, 24b, and 24c. One of the light-emitting elements 24a, 24b, and 24c outputting the optical signal on which the information indicating the signal correction is not superimposed outputs an optical signal indicating information to be transmitted. The EO conversion unit 2 may be configured such that one of the light-emitting elements 24a, 24b, and 24c outputs an optical signal corresponding to only the information indicating the signal correction.

The transmission signal conversion unit 20 may extract the information indicating the signal correction from the signal subjected to the signal correction by the signal correcting unit 16 and encode the extracted information.

The EO conversion unit 2 may be configured to output an optical signal in which the optical signal indicating the information to be transmitted is combined with the optical signal corresponding to the information indicating the signal correction using a multi-value optical modulation technology, instead of the execution of the WDM. Examples of a multi-value optical modulation scheme include QPSK (Quadrature Phase Shift Keying), 8 PSK (8-Phase Shift Keying), and 16 QAM (16-value Quadrature Amplitude Modulation). The EO conversion unit 2 selects a modulation scheme to be used in accordance with the number of required encoding bits. For example, the transmission signal conversion unit 20 performs QPSK (4 values=2 bits) or 8 PSK (8 values=3 bits).

Figure 5B:
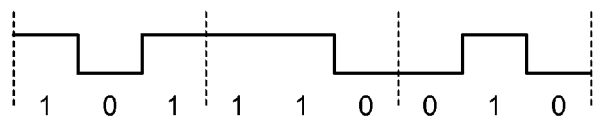

As illustrated in FIG. 5B, the transmission signal conversion unit 20 may be configured to convert the electric signal subjected to the signal correction by the signal correcting unit 16 into a digital signal with a communication rate of an integer multiple of the electric signal. For example, when 1-bit information is transmitted and received at a data communication rate of 4 Gbps, an optical switching time is 500 ps. When the switching time is assumed to be 125 ps (four times), 2-bit information can be transmitted. In the case of an electric signal, when a data inversion time is quadrupled, signal deterioration may be considerable due to a propagation loss.

However, even when the switching time is shortened in the state in which the electric signal is converted into an optical signal, the degree of the signal deterioration is lower compared to an electric signal. Further, when a communication rate becomes an integer multiple of an electric signal, the transmission signal conversion unit 20 may encode the information indicating the signal correction performed by the signal correcting unit 16 and superimpose the information on information to be transmitted. That is, the transmission signal conversion unit 20 may be configured to multiplex the optical signal indicating the information to be transmitted and an optical signal corresponding to the information indicating the signal correction in a time division manner and transmit the multiplexed signal.

Thus, in the modification example of the communication system 1, the optical signal indicating the information to be transmitted and the optical signal corresponding to the information indicating the signal correction are multiplexed (subjected to any multiplexing or modulation) and transmitted, the signal correction performed on the transmitting side can be restored on the receiving side. Therefore, even when an optical signal is used in a part of a communication path, the signal deterioration can be reduced.

Next, the communication system 1 according to a second embodiment will be described. In the communication system 1 according to the second embodiment, a communication device of a transmitting side has the same configuration as a communication device of a receiving side. Hereinafter, the communication system according to the second embodiment will be described in which the communication device of the transmitting side has the same configuration as the communication device of the receiving side.

Second Embodiment

FIG. 6 is a block diagram illustrating the function of a communication device 4 according to the second embodiment. The communication device 4 includes a CPU 40, a memory 42, an optical transceiver 44, and a platform controller hub (PCH) 46. The communication device 4 transmits and receives an optical signal in conformity with, for example, the PCI EXPRESS (registered trademark) 3.0 standard. That is, the communication device 4 has the functions of a transmitting device and a receiving device. The CPU 40 controls each unit of the communication device 4 via a DMI (Direct Media Interface) 41a or a system management bus (SMBus) 41b.

The memory 42 stores, for example, a program to be executed by the CPU 40 or data to be used when the CPU 40 executes the program. The memory 42 can include a ROM (Read Only Memory) and a RAM (Random Access Memory).

The optical transceiver 44 includes an electric-to-optic conversion unit 440, a transmission processing unit 441, an optic-to-electric conversion unit 442, a reception processing unit 443, an EQ (equalizer) setting table 444, and a second register 445. The electric-to-optic conversion unit 440 includes a light-emitting element (LD) and a driving circuit (LDD) and outputs a transmission signal TX of an optical signal. The transmission processing unit 441 receives transmission signals TX of differential signals, takes a difference between the differential signals, and outputs the transmission signal TX which is single end signal to the electric-to-optic conversion unit 440.

The optic-to-electric conversion unit 442 includes a light-receiving unit (PD) and an amplifier (Amp), receives the reception signal RX of the optical signal, and outputs the reception signal RX of the electric signal to the reception processing unit 443. Referring to the EQ setting table 444, the reception processing unit 443 receives the reception signal RX which is single end signal and outputs the differential reception signal RX to the controller hub 46 in accordance with the setting stored by the second register 445.

Figures 7, 8:
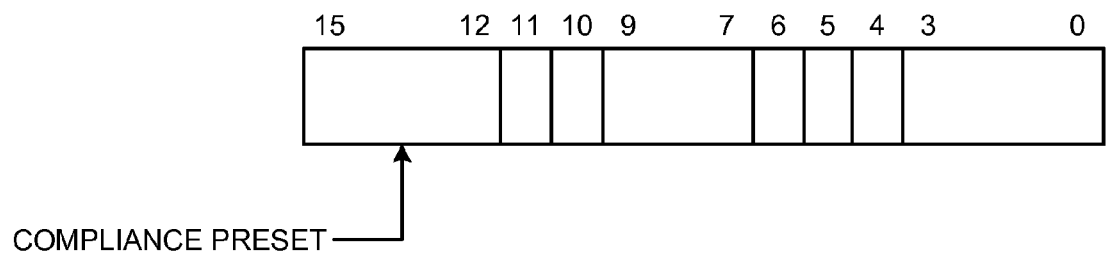
FIG. 7 is a table illustrating a list of presets stored in an EQ setting table.
FIG. 8 is a diagram illustrating an example of a register storing the presets.

The EQ setting table 444 is a table that has information (preset) indicating the signal correction stored in advance. FIG. 7 is a table illustrating a list of presets stored in the EQ setting table 444, when a communication protocol is the PCI EXPRESS (registered trademark) 3.0. As illustrated in FIG. 7, the EQ setting table 444 contains combinations of de-emphases and preshoots. According to the PCI EXPRESS (registered trademark) 3.0, the communication device 4 transmits and receives the preset to and from another communication device 4 by embedding the preset in a data set (packet) called "TS1 Ordered Set" or "TS2 Ordered Set" transmitted and received during execution of a training sequence (sequence of a process of establishing communication). The preset optimum in bi-directional communication of transmission and reception is selected. The value (preset value) of the selected preset is retained in a bit [15:12] of "Link Control 2 Register (30 h)" illustrated in FIG. 8.

The second register 445 (see FIG. 6) is a second storage unit that stores, for example, the preset used to specify another communication device which is a communication partner. The value of the preset or the like stored in the second register 445 is used to restore the signal correction, when a packet is received. Specifically, the second register 445 has a register of the same specification as a bit [15:12] of "Link Control 2 Register (30 h)." The second register 445 outputs a control signal configured to use the stored data to the transmission processing unit 441, the reception processing unit 443, and the EQ setting table 444 under the control of the CPU 40.

The second register 445 is configured to perform reading and writing via the SMBus 41b. When the bit [15:12] of a first register 502 is written on the second register 445, the communication device 4 superimposes, to the electric signal converted from the received optical signal, the same equalizing pattern as an equalizing pattern superimposed to an electric signal by the communication device 4 transmitting an optical signal.

The platform controller hub (PCH) 46 is configured to include a PCIe controller 50. The PCIe controller 50 includes a protocol control unit 500, the first register 502, an S-P (Serial/Parallel) converter 504, and a transceiver 506. The PCIe controller 50 controls the optical transceiver 44 together with the CPU 40.

The protocol control unit 500 is a PCIe protocol control block. The first register 502 is a first storage unit that stores, for example, the preset specified from another communication device which is a communication partner. The value of the preset or the like stored by the first register 502 is used in the signal correction, when a packet is transmitted. The first register 502 includes "Link Control 2 Register (30 h)" described above. The S-P converter 504 converts a serial signal into a parallel signal and converts a parallel signal into a serial signal. The transceiver 506 is a PCIe transceiver and performs transmission and reception with the optical transceiver 44 using a differential signal of an electric signal.

In the communication device 4, a restoring unit is formed by the reception processing unit 443, the transceiver 506, the protocol control unit 500, and the CPU 40. Further, in the communication device 4, a signal correcting unit is formed by the transmission processing unit 441, the transceiver 506, the protocol control unit 500, and the CPU 40.

Next, a process of selecting a bi-directional optimum equalizing pattern between two communication devices 4 (see FIG. 6) according to the second embodiment will be described. FIG. 9 is a diagram illustrating a sequence of the process of selecting the equalizing pattern between two communication devices 4 according to the second embodiment. The two communication devices 4 select the equalizing pattern (optimizes the equalizing) through processes of four phases of Phase 0 to Phase 3. In FIG. 9, the communication device 4 illustrated on the left side is distinguished as a first communication device 4 (upstream side) and the communication device 4 illustrated on the right side is distinguished as a second communication device 4 (downstream side).

Phase 0

The second communication device 4 specifies TX Preset (PS0) to be used by the first communication device 4 using "TS2 Ordered Set." The first communication device 4 reads the specified TX Preset and writes the TX Preset on the first register 502.

Phase 1

The second communication device 4 sets TX Preset (PS1) to be used by the second communication device 4 in the first register 502. The first communication device 4 and the second communication device 4 perform bi-directional communication in this state and confirm that a bit error rate (BER) is equal to or less than 10e-4.

In the first communication device 4 and the second communication device 4, the equalization is not superimposed to the received electric signal, since a Preset value is not set in the second register 445. However, in Phase 1, when the bit error rate is equal to or less than 10e-4, there is no problem with continuation of the sequence in which the equalizing pattern is selected.

Phase 2

The first communication device 4 specifies TX Preset (PS2a) to be used by the second communication device 4 using "TS1 Ordered Set." The second communication device 4 writes the specified TX Preset on the first register 502. Specifically, the protocol control unit 500 writes a Preset value (PS2a) in "Link Control 2 Register (30 h) of the first register 502. The first communication device 4 also writes TX Preset (PS2a) on the second register 445 via the SMBus 41b.

In this state, the first communication device 4 measures the bit error rate of communication data from the second communication device 4. The equalization corresponding to TX Preset (PS2a) stored in the first register 502 is superimposed to the electric signal transmitted by the second communication device 4. The equalization information disappears in the optical communication path. However, the first communication device 4 can superimpose the equalization corresponding to TX Preset (PS2a) stored by the second register 445 to the received electric signal.

Accordingly, the same equalization is superimposed to the electric signals of the transmitting and receiving sides. That is, the signal deterioration in an electric signal transmission path can be suppressed. When the bit error rate is not equal to or less than 10e-12, the first communication device 4 specifies TX Preset (PS2b) different from TX Preset (PS2a) again. The first communication device 4 repeats the adjustment of TX Preset to specify TX Preset, until the bit error rate is equal to or less than 10e-12.

Phase 3

The second communication device 4 specifies TX Preset (PS3a) to be used by the first communication device 4 using "TS1 Ordered Set." The first communication device 4 writes the specified TX Preset on the first register 502. The second communication device 4 also writes TX Preset (PS3a) to the second register 445 via the SMBus41b.

In this state, the second communication device 4 measures the bit error rate of communication data from the first communication device 4. The first communication device 4 superimposes the equalization corresponding to TX Preset (PS3a) stored in the first register 502 to the electric signal to be transmitted. The equalization information disappears in the optical communication path. However, the second communication device 4 can superimpose the equalization corresponding to TX Preset (PS3a) stored by the second register 445 to the received electric signal.

Accordingly, the same equalization is superimposed to the electric signals of the transmitting and receiving sides. That is, the signal deterioration in an electric signal transmission path can be suppressed. When the bit error rate is not equal to or less than 10e-12, the second communication device 4 specifies TX Preset (PS3b) different from TX Preset (PS3a) again. The second communication device 4 repeats the adjustment of TX Preset to specify TX Preset, until the bit error rate is equal to or less than 10e-12.

After the optimization of the equalization is completed, the Preset value is retained in the first register 502 and the second register 445 of each of the first communication device 4 and the second communication device 4. That is, the first communication device 4 and the second communication device 4 can perform the bi-directional communication with high signal quality, since the first communication device 4 and the second communication device 4 can perform the equalization bidirectionally.

According to the aspects of the embodiments, it is possible to obtain the advantage of reducing the signal deterioration, even when an optical signal is used in a part of a communication path.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device comprising:
    a signal correcting unit configured to perform signal correction on an electric signal to reduce signal deterioration occurring in transmission of the electric signal by superimposing information indicating the signal correction on the electric signal, the electric signal being an analog signal that indicates information to be transmitted;
    a conversion unit configured to convert the electric signal subjected to the signal correction into a control signal, the control signal being a multi-bit digital signal that maintains the information indicating the signal correction performed by the signal correcting unit; and
    a light-emitting element configured to generate an optical signal by emitting light in accordance with the control signal converted by the conversion unit such that the optical signal is a multi-bit signal that maintains the information indicating the signal correction.

2. The communication device according to claim 1, wherein the signal correcting unit performs the signal correction to change an amplitude of the electric signal,
    the conversion unit converts the electric signal subjected to the signal correction into the control signal that maintains the information indicating the signal correction performed by the signal correcting unit, by performing A/D conversion so that information indicating an amplitude of the electric signal subjected to the signal correction is retained, and
    the light-emitting element emits the light with an intensity corresponding to the control signal converted by the conversion unit.

3. The communication device according to claim 1, wherein the signal correcting unit performs the signal correction on the electric signal indicating the information to be transmitted in accordance with predetermined information, and the conversion unit converts the electric signal subjected to the signal correction into the control signal in which the predetermined information is encoded and superimposed on the information to be transmitted.

4. The communication device according to claim 3, wherein the conversion unit encodes the information indicating the signal correction performed by the signal correcting unit and superimposes the encoded information on at least one of wavelengths to be subjected to wavelength division multiplexing.

5. The communication device according to claim 3, wherein the conversion unit converts the electric signal into the control signal having a communication rate which is an integer multiple of the electric signal subjected to the signal correction by the signal correcting unit.

6. The communication device according to claim 1, further comprising:

a light-receiving unit that receives an optical signal that maintains the information indicating the signal correction and converts the received optical signal into an electric signal; and a D/A conversion unit that converts the electric signal converted by the light-receiving unit into an analog signal.

7. A communication method performed by a communication device, comprising:

performing signal correction on an electric signal to reduce signal deterioration occurring in transmission of the electric signal by superimposing information indicating the signal correction on the electric signal, the electric signal being an analog signal that indicates information to be transmitted;

converting the electric signal subjected to the signal correction into a multi-bit digital control signal that maintains information indicating the signal correction; and generating an optical signal by emitting light in accordance with the converted control signal such that the optical signal is a multi-bit signal that maintains the information indicating the signal correction.

\* \* \* \* \*